G. W. SEITZ.
MEAT PACKAGE.
APPLICATION FILED AUG. 2, 1910.

1,011,862.

Patented Dec. 12, 1911.

UNITED STATES PATENT OFFICE.

GEORGE W. SEITZ, OF TRENTON, NEW JERSEY, ASSIGNOR TO THE TAYLOR PROVISION COMPANY, OF TRENTON, NEW JERSEY.

MEAT-PACKAGE.

1,011,862.      Specification of Letters Patent.      Patented Dec. 12, 1911.

Application filed August 2, 1910. Serial No. 575,153.

*To all whom it may concern:*

Be it known that I, GEORGE W. SEITZ, a citizen of the United States, residing at Trenton, in the county of Mercer and State of New Jersey, have invented certain new and useful Improvements in Meat-Packages, of which the following is a specification.

My invention relates to an improvement in meat packages, and the object is to provide means whereby the packages or bags are capable of being printed upon, and the ink prevented from passing through the wrapper onto the meat.

The object of this invention is mainly to produce a sack or package in which fresh meat is packed and then smoked. In packing fresh meat such as pork, the package will become greasy, and as it is necessary to provide a sack of such a material as will allow the penetration of smoke whereby the meat can be properly smoked, the grease will penetrate through the package and will cause the ink on the sack to pass onto the meat from the bag, and generally the entire printed matter which is placed upon the sack, will be impressed or disclosed upon the meat, and as red ink is generally used, the meat will be covered with this red ink along the outlines of the printed matter on the sack. Ink passing onto the meat in this manner is considered as poisonous and injurious, and it is to overcome this objection that I have provided a sack which is to be inserted in the outer sack, which will prevent the passage of the ink onto the meat.

A further object of the invention is to prevent molding. The inner bag prevents the grease from passing through the inner and outer sacks, and thereby becoming exposed to the air to cause a mold to be formed.

Figure 1:
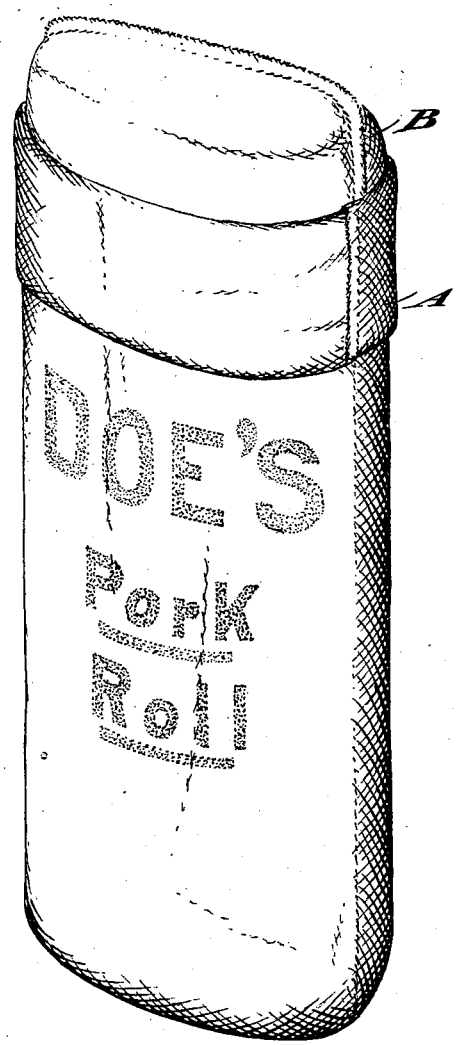
Figure 2:
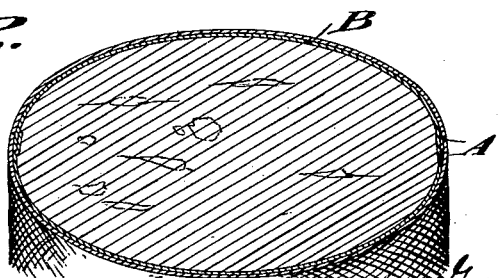

In the accompanying drawings:—Figure 1 is a perspective view, showing the outer sack turned back to disclose the inner sack; and Fig. 2 is a detail sectional view of the sacks.

A represents the outer bag or sack, which is preferably made of coarse material known as Standard 2:35 drill, the weave being close. The inner sack B is made of cheesecloth of a fine thread, but of a coarser weave than the outer sack. The fine thread of the inner sack and the coarse weave, when used in connection with the coarse thread of the outer sack and the fine weave thereof, produces a combination which will allow the smoke to pass through both sacks for giving the meat a proper flavor, and at the same time, the inner sack will prevent any ink on the outer sack from passing through onto the meat.

The inner sack is placed within the outer sack, and the meat is forced into the inner sack, when the sack is closed at its open end, and then the open end of the outer sack is closed.

Having fully described my invention, what I claim as new and desire to secure by Letters Patent, is:—

A meat package comprising an inner and outer bag, the outer bag made of coarse material closely woven, and the inner bag made of a fine cheese-cloth coarsely woven and containing the meat, said bags adapted to allow smoke to penetrate through the interstices thereof, for flavoring the meat, and the inner bag adapted to prevent ink from passing from the outer bag onto the meat.

In testimony whereof I affix my signature, in the presence of two witnesses.

GEORGE W. SEITZ.

Witnesses:
     SCOTT SCAMMELL,
     JOSEPH L. BODINE.

---

Copies of this patent may be obtained for five cents each, by addressing the "Commissioner of Patents, Washington, D. C."